United States Patent

Davis

[15] 3,635,306
[45] Jan. 18, 1972

[54] VEHICLE SPEED INDICATOR AND CONTROLLER

[72] Inventor: Judson S. Davis, Davison, Mich.
[73] Assignee: General Motors Corporation, Detroit, Mich.
[22] Filed: Jan. 8, 1970
[21] Appl. No.: 1,422

[52] U.S. Cl. ..............................180/110, 73/518, 123/102, 317/5, 318/5, 340/263
[51] Int. Cl. .......................................................B60k 31/00
[58] Field of Search..................180/105, 106, 107, 108, 109, 180/110; 123/102, 103, 99; 73/2, 488, 518, 519, 530; 324/160, 163, 164; 116/37; 317/5; 318/340, 347, 348; 340/262, 263

[56] References Cited

UNITED STATES PATENTS

| | | | |
|---|---|---|---|
| 3,524,516 | 8/1970 | Bemmann | 180/108 |
| 2,961,230 | 11/1960 | Moro | 73/519 |
| 3,419,105 | 12/1968 | Hagler et al. | 180/108 |
| 2,444,139 | 6/1948 | Mallory | 123/99 |
| 3,406,775 | 10/1968 | Magnuski | 180/105 |
| 3,011,351 | 12/1961 | Bergsma | 73/519 |
| 3,365,615 | 1/1968 | Bart | 317/5 |

*Primary Examiner*—Leo Friaglia
*Assistant Examiner*—John P. Silverstrim
*Attorney*—Jean L. Carpenter and Paul Fitzpatrick

[57] ABSTRACT

A vehicle speed indicator and controller having a drive motor with differential field windings to position a constant force extension spring between two pulleys to indicate the vehicle speed. A potentiometer supplies a signal corresponding to vehicle speed to one of the differential field windings to cause rotation of the drive motor output shaft. Another potentiometer supplies a signal corresponding to the position of the constant force extension spring to the remaining differential field winding to stop rotation of the drive motor output shaft. The speed controller has a tape having magnetic properties positioned by the speed indicator. At the control speed, an electromagnet is energized to attach to the tape which in turn transfers movement of the speed indicator to a power unit to control a vehicle throttle.

7 Claims, 4 Drawing Figures

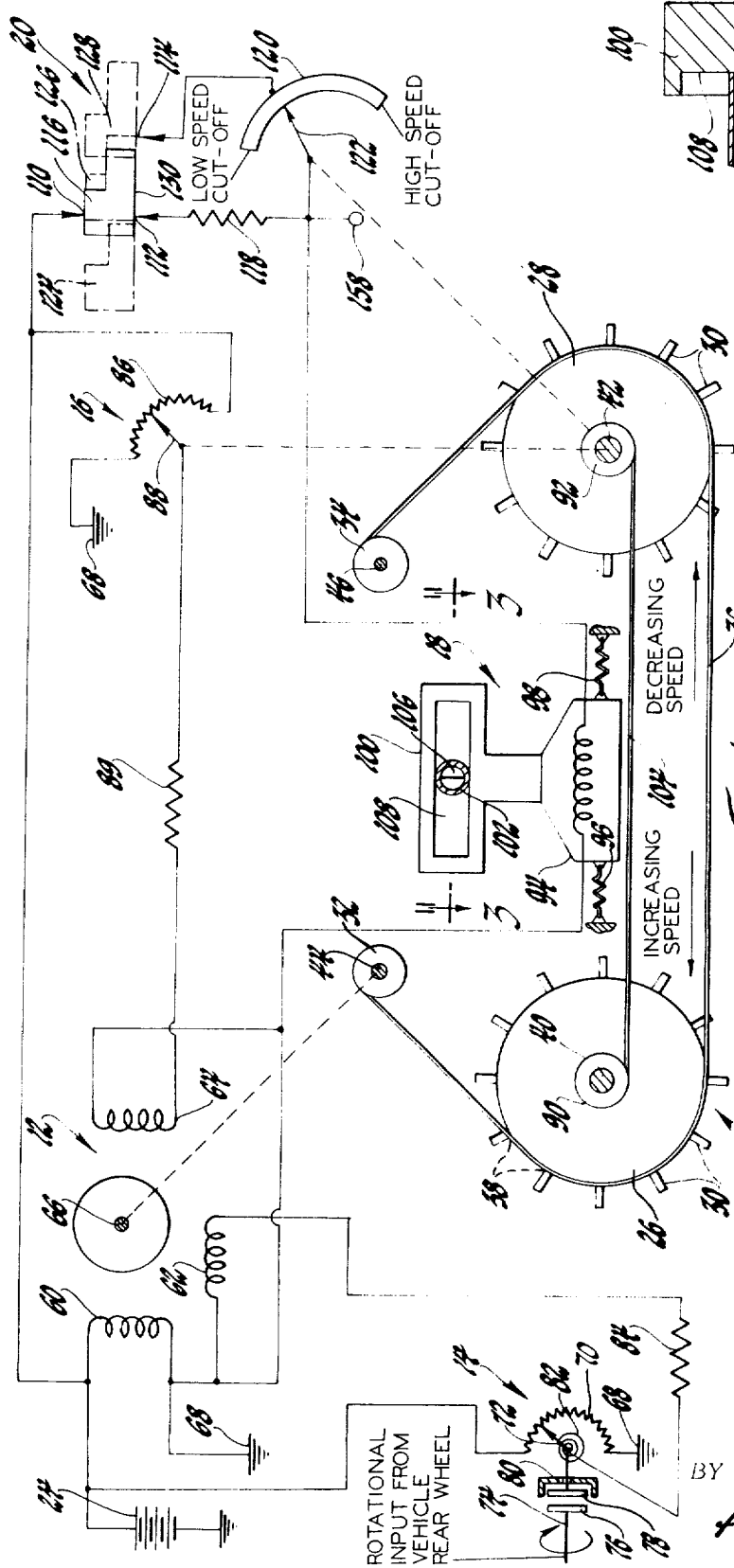

VEHICLE SPEED INDICATOR AND CONTROLLER

This invention relates to an electric speed indicator and controller to indicate the speed of a moving vehicle and to control the speed of the moving vehicle at a speed selected by the operator of the vehicle.

Speed indicators presently used have a mechanical input which usually consists of a flexible shaft extending from the speed indicator to a rotating member of the vehicle which rotates the flexible shaft at a speed directly proportional to the vehicle speed. It is an object of this invention to provide for an electric speed indicator which eliminates the requirement of a flexible shaft connection between the speed indicator and rotating member of the vehicle.

Prior speed indicators which utilize a tape to provide speed indication require one or more springs to provide tape tension and rewinding. These springs tend to introduce nonlinearity in speed indication. It is another object of this invention to provide for a speed indicator whereby the tape is a constant force extension spring which provides its own tension and a constant rewinding force.

In present speed controllers there is a tendency for dirt and grit to build up on the valves with the result that the speed controller would hunt without providing for small adjustments in the vehicle speed. It is another object of this invention to provide a speed controller having a drive unit with sufficient power to overcome the resistance of dirt and grit buildup on the valves.

It is another object of this invention to provide a speed indicator and controller utilizing a drive motor having differential field windings.

A number of electric speed indicators and controllers have been proposed which require a number of amplifiers and power supplies for both the speed indicator and the speed controller. It is another object of this invention to reduce the complexity of speed indicators and controllers by providing an integral speed indicator and controller utilizing multiple function components.

Also a number of speed controllers have been proposed which require a vehicle operator to manually set a control reference to be compared with the vehicle speed to provide speed control. It is another object of this invention to provide a speed controller in which the control reference point tracks the vehicle speed.

In the preferred embodiment of this invention, vehicle speed indication is provided by means of a constant force extension spring in the form of a tape having indicia printed thereon in equal increments to indicate speed. This spring is positioned around two pulleys to provide for linear movement of the indicia between the two pulleys. One end of the spring is secured to a takeup spool which is free to rotate about its axis of rotation and the other end is secured to a takeup spool which is connected to a drive motor output shaft for rotation therewith such that when the drive motor output shaft rotates the takeup spool, it "winds up" the spring or "unwinds" the spring to allow movement of the spring between the two pulleys. The drive motor has two differential field windings. The input to one field winding is obtained from a potentiometer whose wiper arm is positioned by any conventional speed responsive device. The second field winding obtains its input from a potentiometer whose wiper arm is positioned by the rotary motion of one of the pulleys.

To provide for vehicle speed control, a tape having magnetic properties is attached to two pulleys which rotate with the two pulleys of the speed indicator. An electromagnet is spaced between these two pulleys and adjacent to the tape such that when the electromagnet is energized, it becomes attached to the tape. A pneumatic valve is attached to the electromagnet such that when the electromagnet moves linearly with the tape the pneumatic valve controls the atmospheric air input to a pneumatic power unit which in turn controls the position of a carburetor throttle valve of the vehicle to maintain the vehicle speed.

In the Drawings:

FIG. 1 is a schematic diagram of a vehicle speed indicator and controller incorporating the principles of the invention;

FIG. 2 is a cutaway view of the instrument panel showing a vehicle speed indicator according to the present invention;

FIG. 3 is a sectional view of a pneumatic valve usable in my system taken along lines 3—3 of FIG. 1; and FIG. 4 shows a pneumatic valve and power unit utilized in the speed indicator and controller.

The vehicle speed indicator portion of the vehicle speed indicator and controller shown in FIG. 1 is comprised of a speed-indicating device 10, a drive motor 12, a vehicle speed responsive means 14, and an indicating device position responsive means 16. The speed-indicating device 10 is positioned by the drive motor 12. The drive motor 12 receives one signal from the vehicle speed responsive means 14 and another signal from the indicating device position responsive means 16. The vehicle speed responsive means 14 receives a rotational input from a vehicle rear wheel, and the indicating device position responsive means 16 receives a rotational input from the speed indicating device 10.

The vehicle speed controller portion of the vehicle speed indicator and controller shown in FIG. 1 is comprised of a pneumatic pressure controller 18 which is controlled by the speed indicating device 10 and is selectively energized by a speed controller mode switch 20. The pneumatic pressure controller 18 controls the pneumatic pressure in a pneumatic power unit 22 as shown in FIG. 4 which in turn controls the vehicle speed. The drive motor 12, the vehicle speed responsive means 14, indicating device position responsive means 16, and the speed controller mode switch 20 are energized by means of a source of electric power 24 which may be, for example, the vehicle battery.

Referring to FIG. 1, the speed-indicating device 10 is comprised of a pulley 26 and a pulley 28 each having teeth 30 equally spaced around the outer circumference, a takeup spool 32, a takeup spool 34, and a constant force extension spring 36 in the form of a tape having equidistant perforations 38 therein to mate with the sprockets 30. The constant force extension spring 36 is a spring which has an inherent characteristic in the tendency to "wind itself up" when linearly extended. The force which the constant force extension spring 36 exerts to "wind itself up" is constant and is independent of the magnitude of linear extension. An example of such a spring is a spring manufactured under the registered trademark NEG'ATOR by Hunter spring, a division of Ametek, Inc., 66 Spring Avenue, Hatfield, Pa. The pulleys 26 and 28 are rigidly mounted on the shafts 40 and 42, respectively. The shafts 40 and 42 are suitably mounted to be freely rotatable. The constant force extension spring 36 is positioned around the pulleys 26 and 28 with the teeth 30 extending through the perforations 38 and is securely attached at one end to the takeup spool 32 and at the other end to the takeup spool 34. The takeup spools 32 and 34 are suitably secured to rotate with a shaft 44 and a shaft 46, respectively. As seen in FIG. 2, the constant force extension spring 36 has printed on its outer surface a scale 48 having equal graduations 50 and indicia 52 for representing the vehicle speed. The speed indicating device 10 is suitably positioned behind an instrument panel 54 having a window 56 and an index 58, such that the constant force extension spring 36 with the scale 48 printed thereon moves relative to the window 56 and the index 58 such that the position of the constant force extension spring 36 with respect to the index 58 represents the vehicle speed. As illustrated in FIG. 1, the constant force extension spring 36 exerts a constant force for winding itself onto the takeup spools 32 and 34, thereby rotating the pulleys 26 and 28 in a manner to cause and maintain tension of the constant force extension spring 36 between the pulleys 26 and 28.

The drive motor 12 is comprised of an armature winding 60, a pair of differential field windings hereinafter referred to as a speed winding 62 and a position winding 64, and an output shaft 66. The speed winding 62 and the position winding 64 are such that their magnetic forces oppose one another and tend to cancel. Therefore, when the exitation of the speed winding 62 is greater than the exitation of the position winding 64, the output shaft 66 will rotate in a clockwise direction and conversely, when the exitation of the position winding 64 is greater than the exitation of the speed winding 62, the output shaft 66 will rotate in a counterclockwise direction. The armature winding 60 is connected to a source of electric power 24 and to a ground 68. The output shaft 66 is suitably connected to the shaft 44 of the takeup spool 32 so that any rotation of the output shaft 66 will cause a corresponding rotation of the takeup spool 32. The speed winding 62 is connected between the ground 68 and the vehicle speed responsive means 14 and the position winding is connected between the ground 68 and the indicating device position responsive means 16.

The vehicle speed responsive means 14 is comprised of a potentiometer 70 having a wiper arm 72, an input shaft 74, a magnet 76, a speed disc 78 and a field plate 80. The input shaft 74 is shown to be receiving a rotational input from a vehicle rear wheel for illustration purposes only. This input may be from any device on the vehicle whose speed of rotation is directly proportional to the vehicle speed. The magnet 76 is suitably attached to the input shaft 74 for rotation therewith. Rotation of the magnet 76 produces a rotational torque in the speed disc 78. The wiper arm 72 of the potentiometer 70 is suitably connected to the speed disc 78 for rotation therewith. The wiper arm 72 is biased against rotation by a spring 82 and will assume a position corresponding to the vehicle speed. The potentiometer 70 may be made nonlinear in order to compensate for any nonlinearity in the rotational transfer from the input shaft 74 to the speed disc 78. The potentiometer 70 is connected between the source of electric power 24 and the ground 68. The signal input to the speed winding 62 is taken from the potentiometer 70 through the wiper arm 72 and a resistor 84 which has a negative temperature coefficient to provide for temperature compensation.

The indicating device position responsive means 16 is comprised of a potentiometer 86 having a wiper arm 88 suitably connected to the shaft 42 to be rotated thereby. The potentiometer 86 is connected between the source of electric power 24 and the ground 68. The signal input to the position winding 64 is taken from the potentiometer 86 through the wiper arm 88 and a resistor 89 which has a negative temperature coefficient to provide for temperature compensation.

It can be seen that the torque motor 12 is insensitive to variations in the output of the source of electric power 24 since the speed winding 62 and the position winding 64 inputs will rise and fall together.

The pneumatic pressure controller 18 controls the atmospheric air input to the pneumatic power unit 22. The pneumatic pressure controller 18 is comprised of a pulley 90, a pulley 92, a electromagnet 94, a spring 96, a spring 98, a pneumatic valve 100, a conduit 102, and a tape 104 having magnetic properties. The pulleys 90 and 92 are suitably attached to the pulleys 26 and 28 respectively at the centers of rotation. The tape 104 is suitably attached at one end to the pulley 90 and at the other end to the pulley 92. Therefore, as the constant force extension spring 36 moves linearly to indicate the vehicle speed, the tape 104 tracks speed in that its position is a function of the vehicle speed. The electromagnet 94 is connected between the ground 68 and the speed controller mode switch 20 and is positioned adjacent to the tape 104 so that, when energized, it becomes attached to the tape 104 to move linearly therewith. It is therefore necessary that the tape 104 be composed of a material that has magnetic properties, such as steel, so that it may attach to the electromagnet 94. The tape 104 may take the form of a constant force extension spring similar to the constant force extension spring 36 without perforations or indicia and graduations. This would tend to decrease the force necessary to coil the tape as compared to an ordinary tape having magnetic properties as a result of the properties inherent in a constant force extension spring as previously described. The springs 96 and 98 are suitably secured to the electromagnet 94 so as to maintain the electromagnet 94 in a centered position when deenergized. The pneumatic valve 100 is rigidly secured to the electromagnet 94 such that when the electromagnet 94 is attached to the tape 104, linear movement of the tape 104 is transferred to the pneumatic valve 100. Referring to FIGS. 1 and 3, the pneumatic valve 100 is slidably engaged with the stationary conduit 102 having an orifice 106 formed by its end. As linear movement of the tape 104 is transferred to the valve 100 by the electromagnet 94, a pneumatic valve face 108 varies the area of the orifice 106 to control the atmospheric air input to the conduit 102.

Excessive linear movement of the electromagnet 94 and the pneumatic valve 100 may cause the pneumatic valve 100 to strike the conduit 102 or may cause the electromagnet 94 or the pneumatic valve 100 to strike other obstacles that may be present. To assure that such excessive linear movement does not occur when the vehicle speed suddenly increases or decreases due to a sudden change in road load or a combination of road load changes, the preferred embodiment of this invention utilizes the pulleys 90 and 92 which have a smaller diameter than the pulleys 26 and 28. This has the effect of gearing down the linear movement of the tape 104 with respect to the linear movement of the constant force extension spring 36 which represents vehicle speed changes. A diameter ratio of 10 to 1 may be typical. The vehicle speed indicator and controller may be simplified if it is not desired to provide against excessive linear movements of the electromagnet 94 and the pneumatic valve 100 by eliminating the pulleys 90 and 92 and the tape 104. With these elements eliminated, the electromagnet 94 is positioned adjacent to the constant force extension spring 36 which then must be composed of a material having magnetic properties such that when the electromagnet is energized, it will attach to the constant force extension spring 36.

The speed controller mode switch 20 is comprised of the stationary contacts 110, 112 and 114, a movable contact 116, a current limiting resistor 118, and a conducting segment 120 having a wiper arm 122. The stationary contact 110 is connected to the source of electric power 24; the stationary contact 112 is connected to the electromagnet 94 through the current limiting resistor 118; and the stationary contact 114 is connected to the electromagnet 94 through the conducting segment 120 and the wiper arm 122. The movable contact 116 is manually operable and is slidably mounted to engage the stationary contacts 110, 112 and 114. The movable contact 116 has four discrete positions including the broken line positions 124, 126 and 128, and a solid line position 130. When the movable contact 116 is in the position 124, the stationary contact 112 is engaged. When the movable contact 116 is in the position 130, the stationary contacts 110 and 112 are engaged to complete a circuit from the stationary contact 110 to the electromagnet 94 through the stationary contact 112. In the position 130, the current through the electromagnet 94, as limited by the current limiting resistor 118, is insufficient to cause the electromagnet 94 to attach to the tape 104 but is sufficient to cause the electromagnet 94 to remain attached to the tape 104. When the movable contact 116 is in the position 126, a circuit is completed from the stationary contact 110 to the electromagnet 94 through the stationary contact 112 and a circuit is completed from the stationary contact 110 to the electromagnet 94 through the stationary contact 114. The circuit from the stationary contact 110 to the electromagnet through the stationary contact 114 shorts the current limiting resistor 118 to energize the electromagnet 94 if previously in a deenergized condition. When the movable contact 116 is in the position 128, the stationary contact 114 is engaged to allow the vehicle to decelerate to a lower speed which is to be maintained. The wiper arm 122 is suitably connected to the shaft 42 of the pulley 28 to be rotated thereby. The rotation of the wiper arm 122 by the pulley 28 in conjunction with the conducting segment 120 provides for a low-speed cutoff and a high-speed cutoff. At a predetermined minimum speed, the pulley 28 will rotate the wiper arm 122 beyond the low-speed cutoff portion of the conducting segment 120. This assures that the electromagnet 94 cannot be energized when the movable contact 116 is in the position 126 so as to prevent engine runaway in the event that the vehicle operator attempts to activate the speed controller while the vehicle is in a neutral or a reverse gear. At a predetermined maximum speed, the pulley 28 will rotate the wiper arm 122 beyond the high-speed cutoff portion of the conducting segment 120. This assures that the electromagnet 94 cannot be energized beyond the predetermined maximum speed when the movable contact 116 is placed in the position 126.

Referring to FIG. 4, the pneumatic power unit 22 forms a sealed enclosure 132 having within it a diaphragm 134 and a spring 136. The conduit 102 routes air at a controlled pressure from the pneumatic pressure controller 18 to the sealed enclosure 132. A conduit 138 routes vacuum to the sealed enclosure 132 through a valve 140 from a vacuum source which may be, for example, the vehicle manifold. The diaphragm 134 is connected to a carburetor throttle valve 142 by means of a linkage 144 such that movement of the diaphragm 134 provides a rotating motion of the carburetor throttle valve 142 so as to control vehicle speed. When the vehicle speed is not being controlled, the valve 140 is biased to a position 146 by an extension spring 148 to close off the vacuum source and route air at atmospheric pressure to the sealed enclosure 132 through the conduit 138. When the vehicle speed is being controlled, the valve 140 is placed in a position 150 by an electromagnet 152. The electromagnet 152 has a terminal 154 connected to the ground 68 and a terminal 156 connected to a terminal 158 in FIG. 1 so as to be energized by the switch 116 simultaneously with the electromagnet 94 to position the valve 140 in the position 150 to route vacuum to the sealed enclosure 132 through the conduit 138.

The system operates as follows:

Referring to FIG. 1, when the vehicle is at rest there is no input to the shaft 74 and the wiper arm 72 of the potentiometer 70 is positioned by the spring 82 to the ground 68. The wiper arm 88 of the potentiometer 86 is positioned to the ground 68 by means of the pulley 28. The constant force extension spring 36 is wound up on the takeup spool 34 such that the indicia 52 representing a zero vehicle speed is under the index 58 in FIG. 2. Since the wiper arms 72 and 88 are at the ground 68, there are no inputs to the speed winding 62 and the position winding 64, and the output shaft 66 of the drive motor 12 is at rest.

As the vehicle speed increases from zero, the shaft 74 and the magnet 76 are rotated by the vehicle rear wheel at a rate corresponding to the vehicle speed. This rotary motion is transferred to the speed disc 78 to rotate the wiper arm 72 of the potentiometer 70 against the return force of the spring 82 to a position corresponding to the vehicle speed. The wiper arm 72 supplies an electric signal corresponding to the vehicle speed to the speed winding 62 so as to cause the output shaft 66 of the drive motor 12 to rotate, thereby driving the takeup spool 32 to wind up the constant force extension spring 36 thereon. As the constant force extension spring 36 is wound up on the takeup spool 32, the pulleys 26 and 28 are rotated thereby to unwind the constant force extension spring 36 from the takeup spool 34. The constant force extension spring 36 moves linearly between the pulleys 28 and 26 to indicate increasing speed on the instrument panel 54 in FIG. 2. As the pulley 28 rotates, the wiper arm 88 of the potentiometer 86 is rotated thereby to supply a signal corresponding to the rotation of the pulley 28 and therefore the position of the indicating constant force extension spring 36 between the pulleys 26 and 28 to the position winding 64. As the signal in the position winding 64 increases, it alters the net magnetic force between the speed winding 62 and the position winding 64 and when the signal in the position winding 64 equals the signal in the position winding 62, the magnetic forces cancel, thereby stopping the rotation of the output shaft 66 of the drive motor 12. At this time the constant force extension spring 36 is positioned to indicate the vehicle speed sensed by the vehicle speed responsive means 14. When the vehicle speed decreases, the electric signal input to the speed winding 62 from the wiper arm 72 decreases, thereby causing the output shaft 66 of the drive motor 12 to rotate in the opposite direction to unwind the constant force extension spring from the takeup spool 32. As the constant force extension spring 36 is unwound from the takeup spool 32, the force of the constant force extension spring 36 tending to wind itself up on the takeup spool 34 rotates the pulleys 26 and 28 and the takeup spool 34 to move the constant force extension spring 36 linearly between the pulleys 26 and 28 to indicate a decreasing vehicle speed. As the pulley 28 rotates, the wiper arm 88 is rotated thereby to decrease the electric signal input to the position winding 64. When the magnetic forces from the speed winding 62 and the position winding 64 cancel, the output shaft 66 ceases rotation, thereby positioning the constant force extension spring 36 between the pulleys 26 and 28 to indicate the vehicle speed sensed by the vehicle speed responsive means 14.

When the vehicle operator desires automatic speed control, the movable contact 116 is placed into the position 126 to short out the current limiting resistor 118. The electromagnets 94 and 152 are therefore simultaneously energized and the electromagnet 94 attaches to the tape 104. It will be noted that if the vehicle speed is below the low-speed cutoff or above the high-speed cutoff on the conducting segment 120, the current limiting resistor 118 would not be shorted out and therefore, the electromagnets 94 and 152 could not be energized. The movable contact 116 is then returned to the position 130. When the electromagnet 152 is energized, the valve 140 is placed in the position 150 to route vacuum from the vacuum source to the sealed enclosure 132 of the pneumatic power unit 22. As the speed of the vehicle decreases due to road conditions or wind velocity, the tape 104 moves linearly with the speed indicating constant force extension spring 36 to thereby move the electromagnet 94 and the pneumatic valve 100. The area of the orifice 106 formed by the end of the conduit 102 is decreased by the valve face 108 to lessen or cut off the atmospheric air input to the conduit 102. The resulting increase in vacuum in the sealed enclosure 132 moves the diaphragm 134 against the force of the spring 136 so as to position the carburetor throttle valve 142 to provide for an increase in the vehicle speed. Conversely, when the vehicle speed increases due to road conditions or wind velocity, the pneumatic valve 100 is moved to increase the area of the orifice 106 thereby admitting atmospheric air to the sealed enclosure 132 with a resulting decrease in vacuum to allow the spring 136 to move the diaphragm 134 to position the carburetor throttle valve 142 to allow for a decrease in the vehicle speed. The conduit 102 may be made rectangular in form so that the pneumatic pressure within the sealed enclosure 132 varies linearly with changes in vehicle speed.

If the vehicle operator desires to decrease the controlled speed, the movable contact 116 is placed in the position 128. This opens the circuit from the stationary contaCt 110 and deenergizes the electromagnet 94 which releases the tape 104. When the vehicle has decreased to a speed at which the operator desires it to be controlled, the movable contact 116 is returned to the position 130. As the movable contact 116 returns to the position 130, the circuit is completed between the stationary contacts 110 and 114 thereby energizing the electromagnet 94 and again attaching the electromagnet 94 to the tape 104. When the movable contact 116 has returned to the position 130, the electromagnet 94 is maintained in its energized condition by the current from the stationary contact 110 through the movable contact 116, the stationary contact 112, and the current limiting resistor 118.

When it is desired to disengage the speed controller, the movable contact 116 is placed in the position 124 at which time the circuit is opened from the stationary contact 110 to deenergize the electromagnet 94 which releases the tape 104 and to deenergize the electromagnet 152 which releases the valve 140 which is returned to the position 146 by the force of the spring 148 to close off the vacuum source and allow atmospheric air to enter the sealed enclosure 132 of the pneumatic power unit 22 through the conduit 138.

What has been described is a speed indicator and controller which does not require a flexible shaft extending from the vehicle wheel to the speed indicator, which utilizes a single drive unit to operate both the speed indicator and the speed controller, which does not require the operator to set a speed control reference but merely requires the operator to activate a switch, and which is insensitive to variations in the vehicle battery output.

I claim:

1. In a vehicle speed indicator and controller for a throttle controlled vehicle, an indicating device including a tape positionable to indicate vehicle speed, power means for controlling the vehicle throttle position, and control means for the power means selectively connectable directly to the tape and operative in response to deviations of the tape position resulting from vehicle speed changes to cause the power means to alter the throttle position so as to maintain the desired vehicle speed.

2. In a vehicle speed indicator and controller for a throttle controlled vehicle, an indicating device including a tape positionable to indicate vehicle speed, power means for controlling the vehicle throttle position, control means for the power means including valve means, and a valve means controller selectively connectable directly to the tape and operative in response to deviations of the tape position resulting from vehicle speed changes to control the valve means to cause the power means to alter the throttle position so as to maintain the desired vehicle speed.

3. In a vehicle speed indicator and controller for a throttle controlled vehicle, an indicating device including first and second pulleys, tape means having magnetic properties placed around the pulleys and positionable between the pulleys so as to indicate vehicle speed, power means for controlling the vehicle throttle position; control means for the power means including valve means, a valve means controller including an electromagnet positioned in close proximity to the tape means and rigidly secured to the valve means, and electromagnet energizing means to selectively attach the electromagnet to the tape means so as to control the valve means in response to deviations of the tape means position resulting from vehicle speed changes to cause the power means to alter the throttle position so as to maintain the desired vehicle speed.

4. In a vehicle speed indicator and controller for a throttle controlled vehicle, an indicating device including first and second pulleys, first and second takeup spools and a constant force extension spring in the form of a tape having magnetic properties positioned around the first and second pulleys and having one end attached to the first takeup spool and the other end attached to the second takeup spool; means to rotate the second takeup spool so as to linearly move the constant force extension spring between the first and second pulleys and stop this motion when the position of the constant force extension spring represents vehicle speed; power means for controlling the vehicle throttle position; control means for the power means including valve means; and a valve means controller including an electromagnet positioned in close proximity to the constant force extension spring and rigidly secured to the valve means, and electromagnet energizing means to selectively attach the electromagnet to the constant force extension spring so as to control the valve means in response to deviations of the constant force extension spring position resulting from vehicle speed changes to cause the power means to alter the throttle position so as to maintain the desired vehicle speed.

5. In a vehicle speed indicator and controller for a throttle controlled vehicle, an indicating device including first and second pulleys, first and second takeup spools, and a constant force extension spring in the form of a tape positioned around the first and second pulleys and having one end attached to the first takeup spool and the other end attached to the second takeup spool; third and fourth pulleys of lesser diameter than the first and second pulleys attached to the first and second pulleys at their centers of rotation; a tape having magnetic properties and having one end attached to the third pulley and the other end attached to the fourth pulley; means to rotate the second takeup spool so as to linearly move the constant force extension spring between the first and second pulleys and the tape between the third and fourth pulleys and to stop this motion when the position of the constant force extension spring represents vehicle speed; power means for controlling the vehicle throttle position; control means for the power means including valve means; and a valve means controller including an electromagnet positioned in close proximity to the tape and rigidly secured to the valve means and electromagnet energizing means to selectively attach the electromagnet to the tape so as to control the valve means in response to deviations of the tape position resulting from vehicle speed changes to cause the power means to alter the throttle position so as to maintain the desired vehicle speed.

6. In a vehicle speed indicator and controller for a throttle controlled vehicle, an indicating device including first and second pulleys, each having teeth on the outer circumference, first and second takeup spools and a constant force extension spring in the form of a tape having perforations therein to mate with the teeth on the first and second pulleys positioned around the first and second pulleys and having one end attached to the first takeup spool and the other end attached to the second takeup spool; third and fourth pulleys of lesser diameter than the first and second pulleys attached to the first and second pulleys at their centers of rotation; a tape having magnetic properties and having one end attached to the third pulley and the other end attached to the fourth pulley; a source of electric power, a drive motor having an armature winding connected across the source of electric power, speed and position differential field windings, and an output shaft connected to the second takeup spool for rotation therewith; vehicle speed responsive means including variable resistance means connected across the source of electric power and having a wiper arm positioned according to vehicle speed so as to sense vehicle speed and supply a signal corresponding to vehicle speed to the speed differential field winding so as to develop a magnetic force for causing rotation of the output shaft, the connected second takeup spool, the first, second, third and fourth pulleys, the first takeup spool and linear motion of the constant force extension spring between the first and second pulleys and the tape between the third and fourth pulleys; indicating device position responsive means including variable resistance means connected across the source of electric power and having a wiper arm connected to the second pulley so as to be positioned according to the rotation of the second pulley so as to supply a signal corresponding to the position differential field winding so as to develop a magnetic force for opposing the magnetic force developed by the speed differential field winding to stop the linear movement of the constant force extension spring between the first and second pulleys and the tape between the third and fourth pulleys when the position of the constant force extension spring between the first and second pulleys represents the vehicle speed sensed by the vehicle speed responsive means; pneumatic power means for controlling the vehicle throttle position; control means for the pneumatic power means including pneumatic valve means; and a pneumatic valve means controller including an electromagnet positioned in close proximity to the tape and rigidly secured to the pneumatic valve means and electromagnet energizing means to selectively attach the electromagnet to the tape so as to control the pneumatic valve means in response to deviations of the tape position resulting from vehicle speed changes to cause the pneumatic power means to alter the throttle position so as to maintain the desired vehicle speed.

7. The vehicle speed indicator and controller in claim 6 wherein the pneumatic valve means is moved linearly with vehicle speed changes for causing the pneumatic power means to alter the throttle position linearly with changes in vehicle speed.

* * * * *